United States Patent
Baldemair

(10) Patent No.: US 11,777,667 B2
(45) Date of Patent: *Oct. 3, 2023

(54) POWER CONTROL FOR FEEDBACK SIGNALING

(71) Applicant: Telefonaktiebolaget LM Ericsson (publ), Stockholm (SE)

(72) Inventor: Robert Baldemair, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,175

(22) Filed: Sep. 30, 2019

(65) Prior Publication Data

US 2020/0029282 A1 Jan. 23, 2020

Related U.S. Application Data

(63) Continuation of application No. 16/292,999, filed on Mar. 5, 2019, now Pat. No. 10,491,338, which is a
(Continued)

(51) Int. Cl.
*H04L 1/1829* (2023.01)
*H04W 52/14* (2009.01)
(Continued)

(52) U.S. Cl.
CPC .......... *H04L 1/1864* (2013.01); *H04L 1/0057* (2013.01); *H04L 1/1812* (2013.01);
(Continued)

(58) Field of Classification Search
None
See application file for complete search history.

(56) References Cited

U.S. PATENT DOCUMENTS 10,491,338 B2* 11/2019 Baldemair ............. H04L 5/003
2009/0129317 A1* 5/2009 Che ..................... H04L 1/1671
370/328
(Continued)

FOREIGN PATENT DOCUMENTS

CN 101911794 A 12/2010
CN 103339893 A 10/2013
(Continued)

OTHER PUBLICATIONS

International Search Report dated Dec. 21, 2018 for International Application No. PCT/SE2018/050362 filed on Apr. 6, 2018, consisting of 17-pages.
(Continued)

*Primary Examiner* — Faiyazkhan Ghafoerkhan
(74) *Attorney, Agent, or Firm* — Christopher & Weisberg, P.A.

(57) ABSTRACT

There is disclosed a method of operating a user equipment in a radio access network. The method includes transmitting feedback signaling pertaining to a plurality of cells, the feedback signaling being transmitted at a power level, the power level being based on a difference between a value V and a value U, the value V being indicative of the total number of scheduling assignments the user equipment is expected to receive for the plurality of cells, and the value U being indicative of the total number of scheduling assignments for the plurality of cells received by the user equipment. The disclosure also pertains to related devices and methods.

25 Claims, 4 Drawing Sheets

Related U.S. Application Data continuation of application No. PCT/SE2018/050362, filed on Apr. 6, 2018.

(51) Int. Cl.

| | | |
|---|---|---|
| *H04L 1/1812* | (2023.01) | |
| *H04L 1/1867* | (2023.01) | |
| *H04W 52/40* | (2009.01) | |
| *H04L 5/00* | (2006.01) | |
| *H04W 52/34* | (2009.01) | |
| *H04L 1/00* | (2006.01) | |
| *H04W 52/48* | (2009.01) | |
| *H04W 72/0446* | (2023.01) | |
| *H04L 27/00* | (2006.01) | |
| *H04W 16/14* | (2009.01) | |

(52) U.S. Cl.
CPC ......... *H04L 1/1854* (2013.01); *H04L 1/1896* (2013.01); *H04L 5/001* (2013.01); *H04L 5/003* (2013.01); *H04L 5/0032* (2013.01); *H04L 5/0044* (2013.01); *H04L 5/0055* (2013.01); *H04L 5/0057* (2013.01); *H04W 52/146* (2013.01); *H04W 52/346* (2013.01); *H04W 52/40* (2013.01); *H04W 52/48* (2013.01); *H04W 72/0446* (2013.01); *H04L 1/0045* (2013.01); *H04L 1/0072* (2013.01); *H04L 27/0006* (2013.01); *H04W 16/14* (2013.01)

(56) References Cited

U.S. PATENT DOCUMENTS

| | | | | |
|---|---|---|---|---|
| 2013/0329688 A1* | 12/2013 | Yang | ................ | H04W 74/0833 370/329 |
| 2014/0078974 A1* | 3/2014 | Falahati | ............. | H04W 52/146 370/329 |
| 2014/0119339 A1* | 5/2014 | Yang | .................... | H04L 5/0055 370/331 |
| 2014/0126491 A1* | 5/2014 | Ekpenyong | ........... | H04L 1/1864 370/329 |
| 2015/0230242 A1* | 8/2015 | Papasakellariou | .... | H04L 5/0055 370/329 |
| 2015/0236824 A1* | 8/2015 | Lei | ............................ | H04L 5/14 370/280 |
| 2015/0249982 A1* | 9/2015 | Falahati | ................ | H04L 1/1812 370/329 |
| 2016/0029250 A1* | 1/2016 | Yi | ........................ | H04W 28/16 370/329 |
| 2016/0050632 A1* | 2/2016 | Falahati | ............ | H04W 72/0473 370/329 |
| 2016/0295574 A1* | 10/2016 | Papasakellariou | .... | H04L 1/1861 |
| 2017/0215157 A1* | 7/2017 | Yang | ................... | H04W 52/146 |
| 2017/0215172 A1* | 7/2017 | Yang | ................... | H04L 27/2601 |
| 2017/0366305 A1* | 12/2017 | Hwang | ................ | H04L 5/0055 |
| 2018/0019843 A1* | 1/2018 | Papasakellariou | .... | H04L 1/1861 |
| 2018/0077652 A1* | 3/2018 | Seo | ...................... | H04W 52/146 |
| 2018/0092085 A1* | 3/2018 | Shaheen | ............... | H04W 36/14 |
| 2018/0159665 A1* | 6/2018 | Yang | .................... | H04W 72/12 |
| 2018/0206224 A1* | 7/2018 | Hwang | ................. | H04L 5/0012 |
| 2018/0234954 A1* | 8/2018 | Takeda | .................. | H04W 28/04 |
| 2018/0278366 A1* | 9/2018 | Papasakellariou | .... | H04L 5/0053 |
| 2018/0302896 A1* | 10/2018 | Nayeb Nazar | .......... | H04L 1/007 |
| 2018/0310257 A1* | 10/2018 | Papasakellariou | .... | H04W 72/23 |
| 2018/0332568 A1* | 11/2018 | Wu | ....................... | H04B 7/0697 |
| 2019/0028242 A1* | 1/2019 | Xiao | ......................... | H04L 1/16 |
| 2019/0036669 A1* | 1/2019 | Park | ...................... | H04L 5/0055 |
| 2019/0045489 A1* | 2/2019 | He | ......................... | H04W 72/23 |
| 2019/0149271 A1* | 5/2019 | Yin | ...................... | H04L 1/1607 370/329 |
| 2019/0158250 A1* | 5/2019 | Ang | ....................... | H04W 72/27 |
| 2019/0159138 A1* | 5/2019 | Lee | .................... | H04W 52/146 |
| 2019/0159206 A1* | 5/2019 | Sun | ....................... | H04W 72/23 |
| 2019/0215712 A1* | 7/2019 | Babaei | .............. | H04W 74/0833 |
| 2019/0215870 A1* | 7/2019 | Babaei | ................... | H04L 5/0098 |
| 2019/0312688 A1* | 10/2019 | Baldemair | ............ | H04L 1/1896 |
| 2020/0029282 A1* | 1/2020 | Baldemair | ............ | H04L 5/0044 |

FOREIGN PATENT DOCUMENTS

| | | |
|---|---|---|
| CN | 107683575 A | 2/2018 |
| EP | 2876947 A1 | 5/2015 |
| JP | 2013542692 A | 11/2013 |
| JP | 2014513886 A | 6/2014 |
| JP | 2015523032 A | 8/2015 |
| JP | 2015523831 A | 8/2015 |
| RU | 2559830 C2 | 8/2015 |
| RU | 2599730 C2 | 10/2016 |
| WO | 2017026814 A1 | 2/2017 |

OTHER PUBLICATIONS

Japanese Notice of Allowance and Machine Translation dated Aug. 31, 2020 for International Application No. 2019563567, consisting of 5-pages.
Russian Decision to Grant dated Jan. 26, 2021 for Application No. 2020136380/07 filed on Apr. 6, 2018, consisting of 24-pages.
Indian Examination Report dated Dec. 3, 2021 for Application No. 202047043248, consisting of 7 pages.
Chinese Office Action and English Summary dated Oct. 18, 2022 for Application No. 201880090448.3, consisting of 8 pages.
3GPP TSG RAN WG1 #AH 1801 R1-1800453; Title: Corrections on HARQ Feedback; Agenda item: 7.3.3.2; Source Samsung; Document for: Discussion and Decision; Location and Date: Vancouver, Canada, Jan. 22-26, 2018, consisting of 9 pages.
3GPP TSG RAN WG1 Meeting #82bis R1-155093; Title: Dynamic adaptation of PUCCH formats for HARQ-ACK feedback; Agenda Item: 7.2.2.1.2; Source: Huawei, HiSilicon; Document for: Discussion/Decision; Location and Date: Malmö, Sweden, Oct. 5-9, 2015, consisting of 6 pages.

* cited by examiner

POWER CONTROL FOR FEEDBACK SIGNALING

CROSS-REFERENCE TO RELATED APPLICATION

This application is a continuation of U.S. application Ser. No. 16/292,999 filed on Mar. 5, 2019, which is a continuation of International Application No. PCT/SE2018/050362, filed Apr. 6, 2018, the entirety of both of which are incorporated herein by reference.

TECHNICAL FIELD

This disclosure pertains to radio access technology, in particular in the context of telecommunications.

BACKGROUND

Transmission power is one of the most important resources in a radio access network. On one hand, the power should be high enough to ensure reliable reception (respectively decoding/demodulation) of transmitted signaling, on the other hand the interference with other signaling should be limited. Moreover, in particular for wireless devices like user equipments (UEs), battery endurance is an important consideration. Thus, improvements in power control are important for performance and usability of radio access technology.

SUMMARY

It is an object of this disclosure to provide improved power control, in particular in the context of feedback signaling. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardization organization). A suitable RAN may in particular be a RAN according to NR, for example release 15 or later, or LTE Evolution.

Accordingly, there is disclosed a method of operating a user equipment in a radio access network. The method comprises transmitting feedback signaling pertaining to a plurality of cells and/or carriers and/or bandwidth parts, the feedback signaling being transmitted at a power level. The power level is based on a difference between a value V and a value U, the value V being indicative of the total number of scheduling assignments the user equipment is expected to receive for the plurality of cells and/or carriers and/or bandwidth parts, and the value U being indicative of the total number of scheduling assignments for the plurality of cells and/or carriers and/or bandwidth parts received by the user equipment.

Moreover, there may be considered a user equipment for a radio access network. The user equipment is adapted for transmitting feedback signaling pertaining to a plurality of cells and/or carriers and/or bandwidth parts. The feedback signaling is transmitted at a power level, the power level being based on a difference between a value V and a value U. The value V is indicative of the total number of scheduling assignments the user equipment is expected to receive for the plurality of cells and/or carriers and/or bandwidth parts, and the value U is indicative of the total number of scheduling assignments for the plurality of cells and/or carriers and/or bandwidth parts received by the user equipment. The user equipment may comprise, and/or be adapted for utilizing, processing circuitry and/or radio circuitry, in particular a transmitter and/or receiver and/or transceiver, for transmitted the feedback signaling and/or receiving the scheduling assignments. Alternatively, or additionally, it may comprise one or more corresponding modules.

V and U may pertain to represent all cells and/or carriers and/or bandwidth parts, e.g. be a sum of the respective number of assignments. Thus, they may represent the whole of the frequency or cell range or structure the assignments pertain to. The difference between V and U may be seen as an indication of missed scheduling assignments. V may be an estimate, which may for example be determined based on information or indication included in one or more (received) scheduling assignments, for example a counter like a counter DAI and/or total DAI and/or Uplink DAI.

A missed assignment may be an assignment that has not been received, or not been decoded/demodulated correctly by the UE. A received scheduling assignment may be an assignment that has been received and/or decoded and/or demodulated correctly, and/or based on which a UE can determine a transmission scheduled for reception by the UE, e.g. on resources indicated by the scheduling assignment.

The feedback signaling may comprise a maximum number of bits of feedback information, e.g. 11. The actual number of bits may be lower, e.g. dynamically determined. Feedback information may comprise acknowledgement information and/or measurement information and/or scheduling information. A message carrying feedback information may also comprise associated coding bits, e.g. for error encoding like error detection and/or error correction coding. Acknowledgement information may generally indicate whether a scheduled transmission has been received correctly.

It may be considered that the feedback signaling is error encoded based on a Reed-Muller code or scheme.

The feedback signaling is may in general be transmitted on a control channel like PUCCH or PSCCH, or a data channel like PUSCH or PSSCH. It may be considered that the feedback signaling is uplink signaling, for example in response to downlink signaling like downlink scheduling assignments and/or associated scheduled transmissions scheduled for downlink. However, sidelink scenarios may be considered, in which the feedback signaling may be on sidelink in response to sidelink signaling in the complementary direction.

In some variants, V may pertain to a total number of scheduling assignments to which the feedback signaling pertains. In particular, V may pertain to all assignment reception occasions or times in which the UE may be configured to monitor resources for scheduling assignments.

Feedback signaling may be considered to pertain to a scheduling assignment if it includes one or more bits indicating A/N for a transmission scheduled by an assignment, or expected to be scheduled. A scheduling assignment or scheduled transmission may be expected if the UE received an indication of the total number of scheduling assignments it should have received and/or of a size for a codebook, e.g. one of the DAIs described herein. If the expected number is different from the received number, a corresponding number of assignments may have been missed.

It may be considered that V may pertain to the total number of scheduling assignments for the plurality of cells at the same assignment reception occasion or associated time, e.g. starting time of the occasion.

In some variants, V may be based on, or be determined based on, a total downlink assignment indication received in a scheduling assignment. The indication may for example be a total DAI or uplink DAI.

It may be considered that V is determined based on a counter downlink assignment indication received in a scheduling assignment, e.g. a counter DAI.

V may be determined based on an assignment indication received in a scheduling grant, e.g. an Uplink DAI.

In some cases, the highest value of a received DAI associated to the feedback signaling may be considered for V.

In general, U may pertain to all of the plurality of cells. U may generally represent a number of actually received scheduling assignments, e.g. as counted by the UE.

It may be considered that U pertains to the scheduling assignments received at the same assignment reception occasion. It may be generally considered that the differences of Vs and Us for different occasions are summed up, wherein the Vs may be updated for each occasion.

In some variants, the power level may also be based on a value NB indicative of a number of bits to be included in the feedback signaling per missed scheduling assignment. NB may be determined for all cells as a function of cell-specific values.

Moreover, a program product comprising instructions adapted for causing processing circuitry to control and/or perform a method as described herein may be considered. A carrier medium arrangement carrying and/or storing a program product as described herein is also proposed. In addition, there may be considered a network node adapted to receive, and/or decode, feedback signaling described herein, and/or a corresponding method of operating a network node. The network node may comprise, and/or be adapted for utilizing, processing circuitry and/or radio circuitry, in particular a receiver and/or transceiver, for such receiving and/or decoding. Alternatively, or additionally, it may comprise one or more corresponding modules. In general, any action and/or functionality described herein may be performed by, and/or associated to, a corresponding module, which may be implemented in software and/or firmware and/or hardware.

Feedback signaling may comprise and/or carry and/or represent acknowledgement information, in particular A/N bits, e.g. according to a HARQ codebook, which may be determined dynamically. A HARQ codebook may generally indicate the number of A/N bits and/or which bits pertain to which HARQ process and/or scheduled transmission (e.g., data transmission scheduled for reception by a scheduling assignment. A dynamic codebook may be determined based on scheduling assignments received by the UE, e.g. as control signaling comprising control information associated to a physical control channel like a PDCCH. In some cases, feedback signaling may comprise and/or carry and/or represent other control information, e.g. pertain to measurements (e.g., CSI) and/or a scheduling request or associated information. Feedback signaling, in particular acknowledgement information thereof, may pertain to scheduled transmissions of different time, e.g. as configured with associated scheduling assignments.

A scheduling assignment may comprise a counter DAI and/or total DAI, based on which a codebook may be determined or determinable. Alternatively, or additionally, a codebook may be determined or determinable based on an assignment indication in a scheduling grant, e.g. an Uplink DAI, which may indicate a size of a codebook, e.g. for transmission on PUSCH. It may be considered that a scheduling assignment configures or indicates the feedback signaling and/or codebook to which acknowledgement information for the scheduled transmission pertains or belongs.

In general, a scheduling assignment may indicate and/or schedule a transmission, e.g. data transmission and/or a PDSCH transmission, which the UE is intended to receive, e.g. indicating resources for reception of such transmission. Associated acknowledgement information may indicate whether the scheduled transmission has been correctly received or not.

In general, a scheduling assignment may be transmitted on a cell and/or carrier and/or bandwidth part for which it schedules a transmission (e.g., data transmission on PDSCH) for reception. However, it may be considered that a scheduling assignment is transmitted on another cell than the scheduled transmission is scheduled for, e.g. in LAA (licensed-assisted access) scenarios, and/or dual connectivity scenarios, and/or for cross-carrier/cell/bandwidth part scheduling scenarios. U may generally represent the number of all scheduling assignments received on all cells. A scheduling assignment may be implemented as a PDCCH and/or DCI message, e.g. of format 1_0 or 1_1. Different scheduling assignments may have different formats. In particular, in some cases, only some scheduling assignments may comprise a total DAI.

An assignment reception occasion or associated time (interval) may be an occasion in which a UE is configured for monitoring resources (e.g., CORESET and/or control region and/or PDCCH resources and/or search space) for a scheduling assignment that may be intended for reception by the UE. The same occasion or time (interval) may for different cell may occur if the starting time or symbol of the occasion/time is the same. Different occasions may be in the same or different slots, e.g. for the same cell/carrier/bandwidth part, and/or for different ones.

It should be noted that usually A/N indicates whether data transmission (e.g., on PDSCH) scheduled by a scheduling assignment has been received correctly, not whether the scheduling assignment itself has been received correctly. If no scheduling assignment has been received, it may be considered to set an A/N bit to N, or in some cases to omit it. Generally, it will be of low relevance as the associated data transmission will not have been looked for by the UE, which will not expect it.

The approaches described herein allow improved estimate of the power level needed for reliable transmission of feedback signaling, in particular for feedback signaling with dynamic HARQ codebook and/or limited size, e.g. 11 or less bits. Such improved estimate allows, for example, to exploit characteristics of some channel coding approaches like Reed Muller coding, in which a good estimate of relevant bits may influence the power level.

Alternatively, or additionally to the above, there may be considered a method of operating a UE, wherein the method comprising determining a number of relevant A/N bits as describes herein, and/or determining a number of missed scheduling assignments and/or associated A/N bits for a codebook as described herein. A corresponding UE may be considered, which may comprise, and/or be adapted for utilizing, processing circuitry and/or a determining module, for such determining. Transmission of feedback signaling may be based on a codebook determined based on the number of missed assignments and/or the associated bits, e.g. utilizing radio circuitry of the UE, like a transmitter and/or transceiver, for such transmitting.

BRIEF DESCRIPTION OF THE DRAWINGS

The drawings are provided to illustrate concepts and approaches described herein, and are not intended to limit their scope. The drawings comprise.

DETAILED DESCRIPTION

In the following, the approaches are illustrated exemplarily in the context of NR and dynamic HARQ codebooks, however they may be applicable in other types of RAN and/or codebooks as well. It should be noted that all assignments and scheduled transmissions in here pertain to one event of feedback signaling by one UE, and/or for one HARQ codebook, e.g. in one PUCCH transmission or message, or one PUSCH transmission (in which case it may be punctured or rate-matched on PUSCH, e.g. according to a scheduling grant). The feedback signaling may comprise additional information bits, e.g. uplink control information like measurement information and/or a scheduling request.

Figure 1:
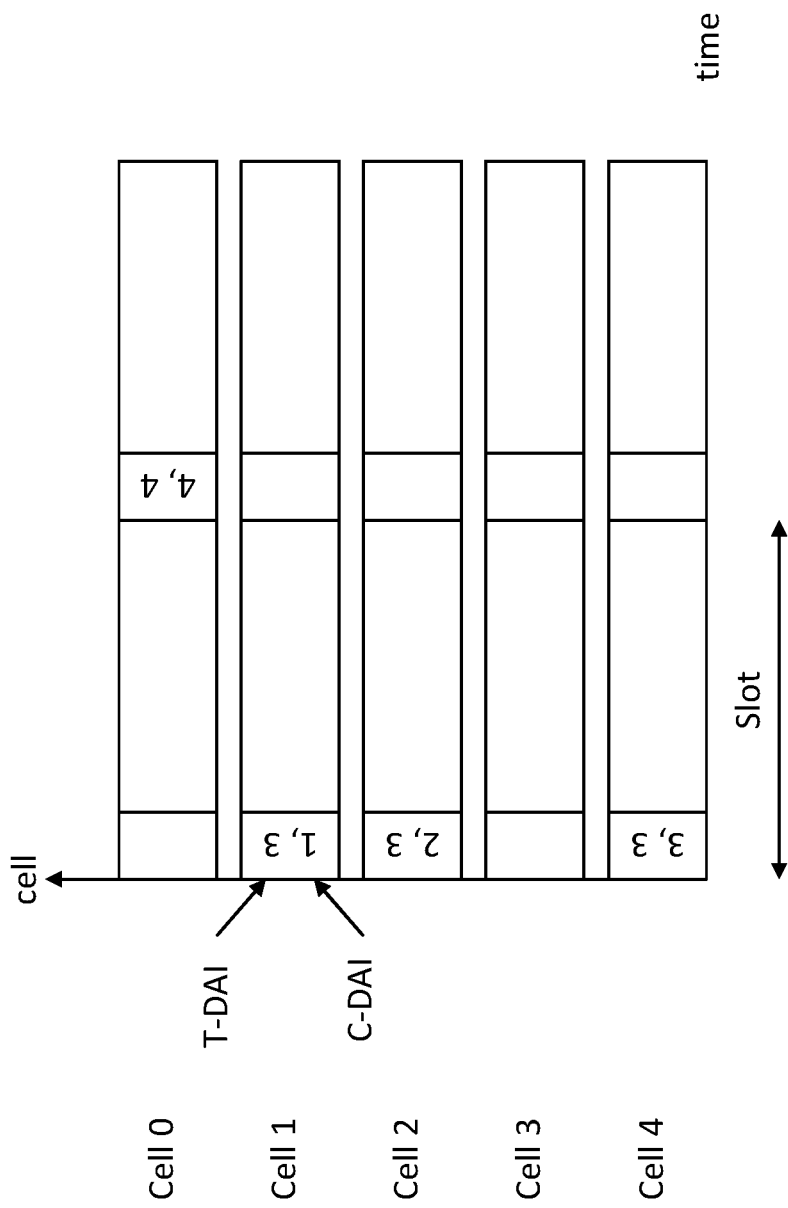
FIG. 1, showing an example of scheduling assignments for different cells with associated counters.

FIG. 1 shows an exemplary carrier aggregation comprising cells 0 to 4 (5 cells in total) in downlink. Other configurations may be considered. By way of example, different slots (in time) are indicated, in which scheduling assignments and/or associated scheduled downlink transmission may occur. All scheduling assignments and associated data transmissions (scheduled by the assignments) are expected to be basis for the feedback signaling, e.g. using one codebook and/or one transmission or message. An occasion may be considered a term for an assignment reception occasion, respectively an associated time (e.g., starting time of the occasion/search space).

The scheduling assignments may be sent at occasions which may generally be represented by configured control regions, e.g. at the beginning of slots. A control region may be a resource structure in time (and/or frequency) configured for (possible) reception of downlink control information, in particular scheduling assignments, respectively for PDCCH reception. A control region may be considered a search space in which a UE may search for DCI and/or PDCCH transmissions which it is intended to receive. An occasion for different cells may be considered the same or simultaneous, if it has the same starting symbol, and/or begins at the same time. Instead of a plurality of cells, a plurality of carriers and/or bandwidth parts may be considered. A scheduling assignment in NR may in particular be of format 1_0 or 1_1, or similar. It may be considered that a scheduling assignment may include a counter a current number of the scheduling assignment like a counter downlink assignment indicator (C-DAI) transmitted to the UE. In some cases, it may additionally comprise a total DAI (T-DAI), which may indicate a total number of scheduling assignments transmitted to the UE.

The total DAI will be updated for each occasion and will be the same for each scheduling assignment at the same occasion (if included, e.g. dependent of the format used for the assignment). The C-DAI will be updated for each scheduling assignment, it may be increased according to cell number (higher cell number will get higher count for the same occasion). It should be noted that a scheduling assignment may generally be transmitted on the cell it schedules a transmission for. It should be noted that for the same occasion, the highest count DAI should be equal to the total DAI for this occasion (if any scheduling assignment is sent). Based on the T-DAI and/or C-DAIs, a UE may determine whether, and in some cases which, scheduling assignments it may have missed.

Currently, in NR, for small payloads (<=11 bit), a UE determines a number of A/N bits for power control based on the following formula:

$$n_{HARQ\text{-}ACK} = \qquad \text{Eq}(1)$$

$$n_{HARQ\text{-}ACK,TB} = \sum_{c=0}^{N_{cells}^{DL}-1} \left( \left( (V_{C\text{-}DAI,m_{last}}^{DL},c - U_{DAI,c}) \bmod 4 \right) \cdot N_{TB,c}^{DL} + \sum_{m=0}^{M-1} N_{m,c}^{recieved} + N_{SPS,c} \right)$$

This number of (relevant) A/N bits may be used as basis for a correction of transmission power, considering missed scheduling assignments, which are represented in the first term of the leading sum. For example, based on the coding scheme used for encoding the feedback bits including the relevant A/N bits, efficient power control may be achieved. Thus, the power level may be set depend on the number of relevant A/N bits, considering a determination of missed scheduling assignments.

The first part in the formula (the first sum) is used to determine missed DL (scheduling) assignments respectively the number of relevant A/N bits, for consideration in power control. The modulo operation accommodates for the counter values being limited to a limited number of bits, and thus may be ambiguous. The first sum runs over the number of cells to be reported on (which are counted from zero). Factor $N_{TB,c}^{DL}$ indicates the number of bits of A/N per transport block, which is configured per cell and usually may be 1 or 2 (depending on how many layers of transmission are configured). $V_{c\text{-}DAI,m_{last},c}$ is counter DAI in the last received PDCCH scheduling DL assignment for this codebook for serving cell c, $U_{DAI,c}$ is the number of PDCCH scheduling DL assignments for this codebook for serving cell c detected by the UE and $N_{TB,c}^{DL}$ is the number of true HARQ bits that are to be generated for cell c (number of configured TB per PDSCH if no spatial bundling is configured, e.g., 1 or 2, or 1 if spatial bundling is configured of multiple configured TBs). Eq(1) is an example for transport-level based A/N feedback, variants with CBG-level feedback may be considered, with corresponding correction factors, e.g. analogous to using factor $N_{TB,c}^{DL}$.

The second sum may be considered representative of A/N bits for transport blocks and/or DCI messages actually received over the occasions (M being the total number of possible occasions, e.g. possible different starting points of search spaces/control regions. The last value $N_{SPS,c}$ pertains to semi-statically scheduled transmissions (as opposed to dynamically scheduled transmissions).

According to the above approach, missed scheduling assignments and counter DAI are used per cell, which may lead to wrong estimates, as e.g. indicated in FIG. 1, in which the UE would assume it missed three out of four scheduling assignments for cell 0, but didn't miss any. This makes the formula unreliable.

Figure 2:
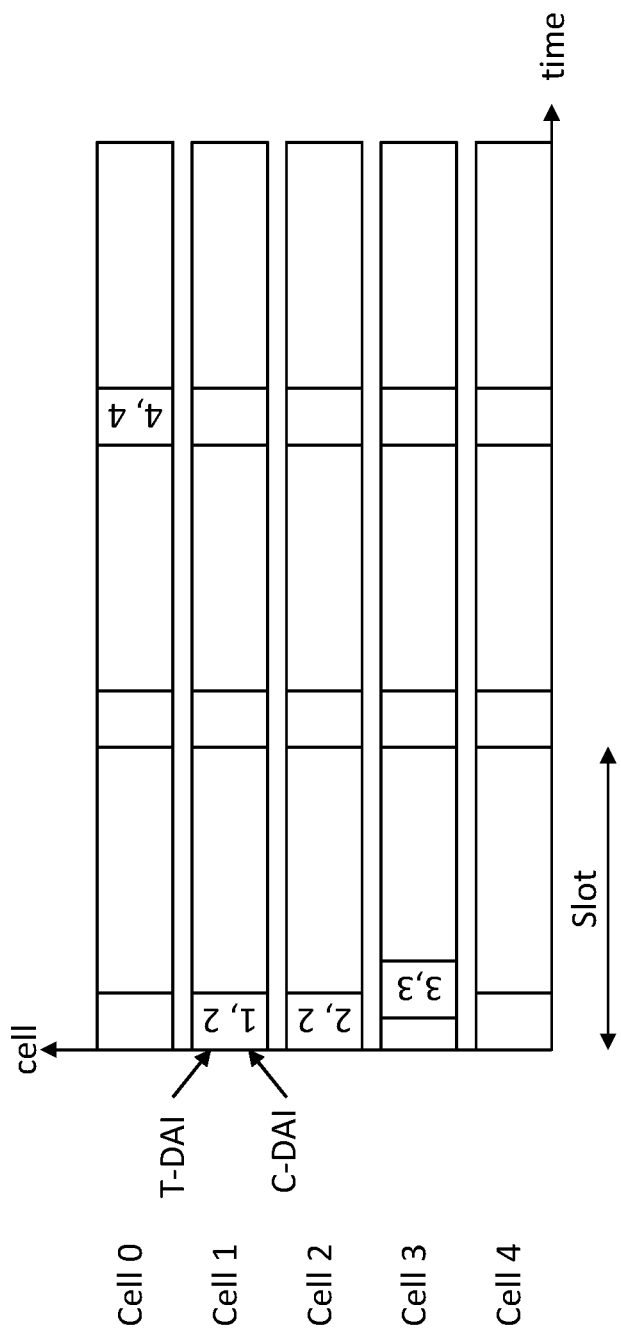
FIG. 2, showing another example of scheduling assignments for different cells with associated counters.

FIG. 2 shows another example, in which in the first slot shown, cell 3 has a different occasion than the other cells, as its starting time is shifted. Here, the current approach could lead to wrong counts of missed scheduling assignments for both cell 3 and 0.

The approaches described herein allow better estimates of missed scheduling assignments. In particular, it is suggested to base the determination of the power level and/or of relevant A/N bits on a term $((V_{DAI,last}^{DL}-U_{DAI}) \mod 4) \cdot N_{TB}^{DL}$ instead of the first sum in Eq(1); other parts may be changed or left untouched. The replacement term may be drawn in front of the leading sum, and/or used instead of determining and summing up missed assignments for each cell. $V_{DAI,last}^{DL}$ is the largest DAI value received (e.g., of the (highest) last received counter, or total DAI, or in some cases an Uplink DAI, e.g. selected according to order of reception and/or highest value. If received at the same time/occasion, the total DAI may be used over a counter DAI. $U_{DAI}$ is the number of received PDCCH scheduling DL assignments (or more generally, scheduling assignments) for the current HARQ codebook across all cells. For $N_{TB}^{DL}$, different options may be considered: If all cells have same TB/PDSCH and bundling configuration: Use value derived from this common configuration, e.g. 1 or 2 bits, or another value, e.g. depending on the code blocks or CBGs to report on. If some cells require 1, some cells require 2 bits: Either use always 1, allowing a low number of bits to be used, or use always 2 or the largest value (for code block/CBG-level reporting) for a robust solution, or use a value determined as a function of TB/PDSCH and bundling/CBG configuration across cells, e.g. an average over cells, which may be weighted, e.g. according to number of scheduling assignments per cell and/or whether a cell is requires Listen-Before Talk or not, and/or depending on Quality of Service requirements for the scheduled transmissions and/or channels, and/or application or type of scheduling, e.g. whether the transmission scheduled is slot-based or mini-slot based, or whether it is for URLLC or not. Corresponding information may be provided in the scheduling assignment scheduling the transmission in question. Accordingly, to this approach, V is represented by $V_{DAI,last}^{DL}$ and U by $U_{DAI}$, which are cell-independent and/or may be considered to be indicative of the whole carrier aggregation, and/or plurality of cells and/or bandwidth parts and/or carriers. $N_{TB}^{DL}$ may similarly be considered cell-independent, and/or be indicative of the whole carrier aggregation, and/or plurality of cells and/or bandwidth parts and/or carriers. This approach covers the whole time in which scheduling assignments are received, which may be up the slot in which the feedback signaling is to be transmitted.

In another approach, it may be considered to determine the difference between V and U for the plurality of cells for each occasion. For example, it may be considered to replace the first sum in Eq(1) with $\Sigma_{m=0}^{M-1}((V_{DAI,m}^{DL}-U_{DAI,m}) \mod 4) \cdot N_{TB,m}^{DL}$, which may be used outside the sum over the cells. Herein, M is the number of occasions for the feedback signaling and/or codebook, $V_{DAI,m}^{DL}$ represents V and may be based on or be the DAI value of the total DAI received at PDCCH monitoring occasion m, or, if no total DAI is received, counter DAI value received in PDCCH for highest cell, or generally, the highest available DAI value for the occasion. This V may represent the change in the highest available DAI value between occasions, it may be updated for each occasion. For example, for occasion m, the V for the occasion m−1 may be subtracted from the highest value received in m, or a corresponding correction value may be determined and/or subtracted for a sum over all occasions.

$U_{DAI,m}$ represents U and is the number of PDCCH transmissions or scheduling assignments received in occasion m for the current HARQ codebook across all cells (for which such are received).

$N_{TB,m}^{DL}$ (which can also represent a CBG-level HARQ configuration) can be for example (e.g., analogous to the above approach):

If all cells have same CBG/ITB/PDSCH and bundling configuration: Use value derived from this common configuration; or If some cells require 1, some cells require 2 bits: Either use always 1, use always 2, use as a function of TB/PDSCH and bundling and/or CBG configuration across cells, analogous to the approach described above; or If the UE can determine the cell for which the PDCCH has been missed, e.g. based on C-DAI and/or T-DAI, use $N_{TB}^{DL}$ for this cell.

Figure 3:
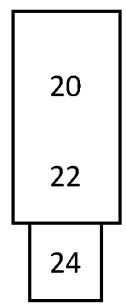
FIG. 3, showing an exemplary radio node implemented as UE.

FIG. 3 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 4:
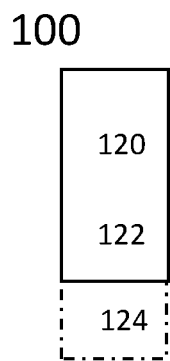
FIG. 4, showing an exemplary radio node implemented as network node.

FIG. 4 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilizing and/or via such intermediate system/s. Providing information may be for radio transmission and/or for transmission via an air interface and/or utilizing a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data.

The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channels may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

A radio node may generally be considered a device or node adapted for wireless and/or radio (and/or microwave) frequency communication, and/or for communication utilizing an air interface, e.g. according to a communication standard. A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein. The terms wireless device, user equipment (UE) and terminal may be considered to be interchangeable in the context of this disclosure. A wireless device, user equipment or terminal may represent an end device for communication utilizing the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein. Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution. A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Feedback signaling like acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing feedback signaling and/or acknowledgement signaling and/or resource requesting information, may comprise encoding and/or modulating. Encoding and/or modulating may comprise error detection coding and/or forward error correction encoding and/or scrambling. Receiving signaling like control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilize, and/or be adapted to utilize, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilizing microwave and/or millimeter and/or other frequencies, in particular between 100 MHz or 1 GHz, and 100 GHz or 20 or 10 GHz. Such communication may utilize one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilize TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilizing a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilizing the sidelink for communication (respectively, for signaling). Sidelink transmission and/or transmitting on a sidelink may be considered to comprise transmission utilizing the sidelink, e.g. associated resources and/or transmission formats and/or circuitry and/or the air interface. Sidelink reception and/or receiving on a sidelink may be considered to comprise reception utilizing the sidelink, e.g. associated resources and/or transmission formats and/or circuitry and/or the air interface. Sidelink control information (e.g., SCI) may generally be considered to comprise control information transmitted utilizing a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbol. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronization structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot. A slot may consist of 14 or fewer symbols, a mini-slot may consist of fewer symbols than a slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting and/or scheduling request information.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgement information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling utilizing, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling. Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks. Code blocks may be configured to code block groups, of which a transport block may comprise one or more. Acknowledgement information (e.g., A/N bits) may pertain to code blocks or CBGs or transport blocks. A code block may comprise information/data bits (payload) and error coding bits, in particular error detection bits, e.g. CRC bits, determined based on the information bits, and/or forward error coding bits determined based on the information bits and/or error detection bits. A transport block, if comprising a plurality of code blocks, may comprise the bits of the code blocks and error coding bits, e.g. error detection bits and/or forward error correction bits, which may be determined based on the bits of the code blocks. In some variants, CBGs be combined from code blocks without additional error coding on the CBG level.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/ usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

ABBREVIATION EXPLANATION

ACK/NACK Acknowledgment/Negative Acknowledgement, also A/N
ARQ Automatic Repeat reQuest
CAZAC Constant Amplitude Zero Cross Correlation
CBG Code Block Group
CDM Code Division Multiplex
CM Cubic Metric
CQI Channel Quality Information
CRC Cyclic Redundancy Check
CRS Common reference signal
CSI Channel State Information
CSI-RS Channel state information reference signal
DAI Downlink Assignment Indicator
DCI Downlink Control Information
DFT Discrete Fourier Transform
DM(-)RS Demodulation reference signal(ing)
FDM Frequency Division Multiplex
HARQ Hybrid Automatic Repeat Request
IFFT Inverse Fast Fourier Transform
MBB Mobile Broadband
MCS Modulation and Coding Scheme
MIMO Multiple-input-multiple-output
MRC Maximum-ratio combining
MRT Maximum-ratio transmission
MU-MIMO Multiuser multiple-input-multiple-output
OFDM/A Orthogonal Frequency Division Multiplex/Multiple Access
PAPR Peak to Average Power Ratio
PDCCH Physical Downlink Control Channel
PDSCH Physical Downlink Shared Channel
PRACH Physical Random Access CHannel
PRB Physical Resource Block
PUCCH Physical Uplink Control Channel
PUSCH Physical Uplink Shared Channel
(P)SCCH (Physical) Sidelink Control Channel
(P)SSCH (Physical) Sidelink Shared Channel
RB Resource Block
RRC Radio Resource Control
SC-FDM/A Single Carrier Frequency Division Multiplex/Multiple Access
SCI Sidelink Control Information
SINR Signal-to-interference-plus-noise ratio
SIR Signal-to-interference ratio
SNR Signal-to-noise-ratio
SR Scheduling Request
SRS Sounding Reference Signal(ing)
SVD Singular-value decomposition
TB Transport Block
TDM Time Division Multiplex
UCI Uplink Control Information
UE User Equipment
URLLC Ultra Low Latency High Reliability Communication
VL-MIMO Very-large multiple-input-multiple-output
ZF Zero Forcing Abbreviations may be considered to follow 3GPP usage if applicable.

What is claimed is:

1. A method of operating a user equipment in a radio access network, the method comprising transmitting feedback signaling pertaining to a plurality of cells, the feedback signaling being transmitted at a power level, the power level being based on a difference between a value V and a value U, the value V being indicative of a highest downlink assignment index (DAI) received during a monitoring occasion, and the value U being indicative of a total number of scheduling assignments for the plurality of cells received by the user equipment.

2. The method according to claim 1, wherein the feedback signaling comprises a maximum number of bits of feedback information.

3. The method according to claim 1, wherein the feedback signaling is error encoded based on a Reed-Muller code.

4. The method according to claim 1, wherein the feedback signaling is transmitted on one of a control channel and a data channel.

5. The method according to claim 1, wherein V pertains to a total number of scheduling assignments to which the feedback signaling pertains.

6. The method according to claim 1, wherein V pertains to the total number of scheduling assignments for the plurality of cells at a same assignment reception occasion time.

7. The method according to claim 1, wherein V is determined based at least in part on a total downlink assignment indication received in a scheduling assignment.

8. The method according to claim 1, wherein V is determined based at least in part on a counter downlink assignment indication received in a scheduling assignment.

9. The method according to claim 1, wherein V is determined based at least in part on an assignment indication received in a scheduling grant.

10. The method according to claim 1, wherein U pertains to all of the plurality of cells.

11. The method according to claim 1, wherein U pertains to the scheduling assignments received at a same assignment reception occasion.

12. The method according to claim 1, wherein the power level is also based on a value NB indicative of a number of bits to be included in the feedback signaling per missed scheduling assignment.

13. A user equipment for a radio access network, the user equipment being configured to transmit feedback signaling pertaining to a plurality of cells, the feedback signaling being transmitted at a power level, the power level being based on a difference between a value V and a value U, the value V being indicative of a highest downlink assignment index (DAI) received during a monitoring occasion, and the value U being indicative of a total number of scheduling assignments for the plurality of cells received by the user equipment.

14. The user equipment according to claim 13, wherein the feedback signaling comprises a maximum number of bits of feedback information.

15. The user equipment according to claim 13, wherein the feedback signaling is error encoded based on a Reed-Muller code.

16. The user equipment according to claim 13, wherein the feedback signaling is transmitted on one of a control channel and a data channel.

17. The user equipment according to claim 13, wherein V pertains to a total number of scheduling assignments to which the feedback signaling pertains.

18. The user equipment according to claim 13, wherein V pertains to the total number of scheduling assignments for the plurality of cells at a same assignment reception occasion time.

19. The user equipment according to claim 13, wherein V is determined based at least in part on a total downlink assignment indication received in a scheduling assignment.

20. The user equipment according to claim 13, wherein V is determined based at least in part on a counter downlink assignment indication received in a scheduling assignment.

21. The user equipment according to claim 13, wherein V is determined based at least in part on an assignment indication received in a scheduling grant.

22. The user equipment according to claim 13, wherein U pertains to all of the plurality of cells.

23. The user equipment according to claim 13, wherein U pertains to the scheduling assignments received at a same assignment reception occasion.

24. The user equipment according to claim 13, wherein the power level is also based on a value NB indicative of a number of bits to be included in the feedback signaling per missed scheduling assignment.

25. A non-transitory computer storage medium storing an executable computer program that, when executed, cause processing circuitry to at least one of control and perform a method of operating a user equipment in a radio access network, the method comprising transmitting feedback signaling pertaining to a plurality of cells, the feedback signaling being transmitted at a power level, the power level being based on a difference between a value V and a value U, the value V being indicative of a highest downlink assignment index (DAI) received during a monitoring occasion, and the value U being indicative of a total number of scheduling assignments for the plurality of cells received by the user equipment.

* * * * *

UNITED STATES PATENT AND TRADEMARK OFFICE
CERTIFICATE OF CORRECTION

| | |
|---|---|
| PATENT NO. | : 11,777,667 B2 |
| APPLICATION NO. | : 16/588175 |
| DATED | : October 3, 2023 |
| INVENTOR(S) | : Robert Baldemair |

It is certified that error appears in the above-identified patent and that said Letters Patent is hereby corrected as shown below:

On the Title Page

On Page 2, Item (56), under "OTHER PUBLICATIONS", in Column 2, Line 11, delete "Source" and insert -- Source: --, therefor.

In the Specification

In Column 1, Line 8, delete "2019," and insert -- 2019, now U.S. Pat. No. 10,491,338, --, therefor.

In Column 2, Line 3, delete "transmitted" and insert -- transmitting --, therefor.

In Column 2, Line 38, delete "is may" and insert -- may --, therefor.

In Column 3, Line 48, delete "(e.g.," and insert -- e.g., --, therefor.

In Column 4, Line 58, delete "describes" and insert -- described --, therefor.

In Column 5, Line 21, delete "in here" and insert -- here --, therefor.

In Column 5, Line 64, delete "of the" and insert -- on the --, therefor.

In Column 6, Lines 20-22, delete "$\sum_{m=0}^{M-1} N_{m,c}^{recieved} + N_{SPS,c}$" and insert -- $\sum_{m=0}^{M-1} N_{m,c}^{received} + N_{SPS,c}$ --, therefor.

Signed and Sealed this
Eleventh Day of June, 2024

*Katherine Kelly Vidal*
Katherine Kelly Vidal
*Director of the United States Patent and Trademark Office*

CERTIFICATE OF CORRECTION (continued)
U.S. Pat. No. 11,777,667 B2

In Column 6, Line 43, delete "$V_{C-DAI,m_{last},C}$" and insert -- $V_{C-DAI,m_{last},C}$ --, therefor.

In Column 6, Line 57, delete "(M" and insert -- M --, therefor.

In Column 7, Line 33, delete "requires" and insert -- required --, therefor.

In Column 7, Line 40, delete "Accordingly, to" and insert -- Accordingly, in --, therefor.

In Column 7, Line 49, delete "up the" and insert -- up to the --, therefor.

In Column 8, Line 8, delete "CBG/ITB/PDSCH" and insert -- CBG/TB/PDSCH --, therefor.

In Column 8, Line 42, delete "show" and insert -- shows --, therefor.

In Column 11, Line 1, delete "of for" and insert -- for --, therefor.

In Column 11, Line 17, delete "channels" and insert -- channel/s --, therefor.

In Column 12, Line 12, delete "of for" and insert -- for --, therefor.

In Column 12, Line 35, delete "carried" and insert -- carrying --, therefor.

In Column 12, Line 39, delete "additionally" and insert -- additional --, therefor.

In Column 13, Line 38, delete "Circuitry)" and insert -- Circuit) --, therefor.

In Column 13, Line 63, delete "may be" and insert -- may --, therefor.

In Column 14, Line 59, delete "described" and insert -- describe --, therefor.

In Column 16, Line 58, delete "considered a" and insert -- considered as a --, therefor.

In Column 16, Lines 61-62, delete "message/s" and insert -- message/s. --, therefor.

In Column 17, Line 18, delete "general" and insert -- generally --, therefor.

In Column 19, Line 4, delete "V21" and insert -- V2I --, therefor.

In Column 19, Line 10, delete "CHannel," and insert -- Channel, --, therefor.

In Column 19, Line 13, delete "CHannel," and insert -- Channel, --, therefor.

In Column 19, Line 16, delete "used" and insert -- uses --, therefor.

CERTIFICATE OF CORRECTION (continued)
U.S. Pat. No. 11,777,667 B2

In Column 21, Line 63, delete "may be" and insert -- be --, therefor.

In Column 22, Lines 21-22, delete "distinguished" and insert -- difference --, therefor.

In Column 23, Line 8, delete "considered a form or" and insert -- considered as a form of --, therefor.

In Column 23, Line 66, delete "of for" and insert -- for --, therefor.

In Column 24, Line 6, delete "Channel Quality Information (CQI)," and insert -- Channel Quality Indicator (CQI), --, therefor.

In Column 24, Line 14, delete "subelement" and insert -- sub element --, therefor.

In Column 24, Line 34, delete "controls signaling" and insert -- control signaling --, therefor.

In Column 24, Line 56, delete "information if" and insert -- information --, therefor.

In Column 26, Line 4, delete "CQI Channel Quality Information" and insert -- CQI Channel Quality Indicator --, therefor.

In Column 26, Line 22, delete "OFDM/A" and insert -- OFDMA --, therefor.

In Column 26, Line 27, delete "CHannel" and insert -- Channel --, therefor.

In Column 26, Line 35, delete "SC-FDM/A" and insert -- SC-FDMA --, therefor.

In Column 26, Lines 48-49, delete "URLLC Ultra Low Latency High Reliability Communication" and insert -- URLLC Ultra-Reliable Low Latency Communication --, therefor.